(12) United States Patent
Pham

(10) Patent No.: US 10,217,243 B2
(45) Date of Patent: Feb. 26, 2019

(54) METHOD, SYSTEM AND APPARATUS FOR MODIFYING A SCENE MODEL

(71) Applicant: CANON KABUSHIKI KAISHA, Tokyo (JP)

(72) Inventor: Quang Tuan Pham, North Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 43 days.

(21) Appl. No.: 15/385,682

(22) Filed: Dec. 20, 2016

(65) Prior Publication Data

US 2018/0174331 A1 Jun. 21, 2018

(51) Int. Cl.
| | |
|---|---|
| G06K 9/62 | (2006.01) |
| G06T 7/90 | (2017.01) |
| G06T 11/00 | (2006.01) |
| G06K 9/46 | (2006.01) |
| G06T 7/194 | (2017.01) |

(Continued)

(52) U.S. Cl.
CPC .......... *G06T 11/001* (2013.01); *G06K 9/4652* (2013.01); *G06K 9/6202* (2013.01); *G06K 9/6215* (2013.01); *G06T 7/11* (2017.01); *G06T 7/194* (2017.01); *G06T 7/90* (2017.01); *G06T 11/60* (2013.01); *G06T 2207/10004* (2013.01); *G06T 2207/10016* (2013.01); *G06T 2207/10024* (2013.01); *G06T 2207/20221* (2013.01)

(58) Field of Classification Search
CPC .. G06K 9/4652; G06K 9/6202; G06K 9/6215; G06T 7/11; G06T 7/194; G06T 7/90; G06T 11/001; G06T 11/60; G06T 2207/10004; G06T 2207/10016; G06T 2207/10024; G06T 2207/20221
See application file for complete search history.

(56) References Cited

U.S. PATENT DOCUMENTS

| | | | |
|---|---|---|---|
| 8,823,745 B2 | 9/2014 | Francois | |
| 2010/0021056 A1* | 1/2010 | Chen | G06K 9/00234 382/165 |

(Continued)

OTHER PUBLICATIONS

Toyama et al. ("Principles and practice of background maintenance," International Conference on Computer Vision, Sep. 1999) (Year: 1999).*

(Continued)

*Primary Examiner* — Yubin Hung
(74) *Attorney, Agent, or Firm* — Canon U.S.A., Inc. IP Division

(57) ABSTRACT

A method of modifying a scene model for a sequence of input images includes receiving, selecting, determining, and modifying. Scene modes associated with the sequence are received. For each image pixel in an input image of the sequence, two scene modes are selected from the received scene modes based on distances between the image pixel color value and the scene modes color values at a corresponding pixel location. It is determined if the image pixel color value matches the color value of any of the selected scene modes. It is determined if the image pixel color value is a mixture of the color values of the selected scene modes. The color value of a closest selected scene mode is modified or is maintained depending on whether there is one matched mode and the image pixel color value is not a mixture of the color values of the selected scene modes.

13 Claims, 8 Drawing Sheets

(51) Int. Cl.
*G06T 7/11* (2017.01)
*G06T 11/60* (2006.01)

(56) References Cited

U.S. PATENT DOCUMENTS

| | | | |
|---|---|---|---|
| 2010/0098331 A1* | 4/2010 | Meng | G06T 7/11 382/164 |
| 2010/0142809 A1* | 6/2010 | Won | G06K 9/4652 382/165 |
| 2010/0246945 A1* | 9/2010 | Inoue | H04N 19/172 382/165 |

OTHER PUBLICATIONS

Maik et al. ("Robust background generation using a modified mixture of Gaussian model for object detection," The 18th IEEE International Symposium on Consumer Electronics, Jun. 22-25, 2014) (Year: 2014).*

Zhao et al. ("A moving target detection algorithm based on GMM and improved Otsu method," Proc. SPIE, vol. 9301, Nov. 24, 2014) (Year: 2014).*

Song et al. ("A Robust Moving Objects Detection Based on Improved Gaussian Mixture Model," 2010 International Conference on Artificial Intelligence and Computational Intelligence, Oct. 23-24, 2010) (Year: 2010).*

Suo et al. ("An improved adaptive background modeling algorithm based on Gaussian Mixture Model," 9th International Conference on Signal Processing, Oct. 26-29, 2008) (Year: 2008).*

Porikli, Fatih, et al. Bayesian Background Modeling for Foreground Detection. In ACM International Workshop on Video Surveillance and Sensor Networks (VSSN), Nov. 2005, p. 55-58.

Stauffer, Chris, et al. Learning Patterns of Activity Using Real-Time Tracking. IEEE Transactions on Pattern Analysis and Machine Intelligence, Aug. 2000, pp. 747-757, vol. 22, No. 8.

* cited by examiner

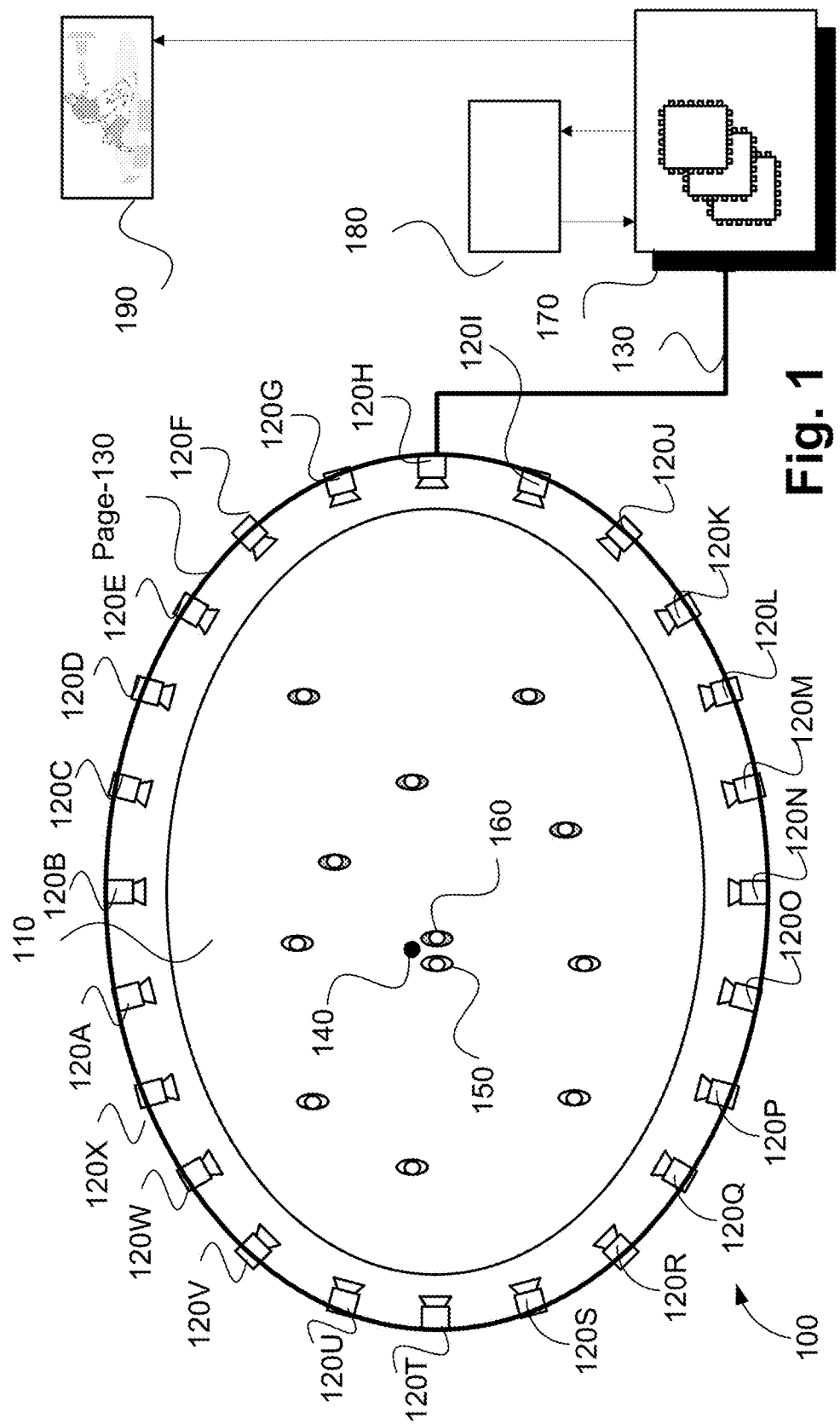

METHOD, SYSTEM AND APPARATUS FOR MODIFYING A SCENE MODEL

FIELD OF INVENTION

The present disclosure relates to video segmentation and, in particular, to a method, apparatus and system for modifying a scene model. The present disclosure also relates to a computer program product including a computer readable medium having recorded thereon a computer program for modifying a scene model.

DESCRIPTION OF BACKGROUND ART

A video is a sequence of images. The images may also be referred to as frames. The terms 'frame' and 'image' are used interchangeably throughout this specification to describe a single image in an image sequence, or a single frame of a video.

An image is made up of pixels where each pixel is represented by one or more values representing the visual properties at that pixel. For example, in one scenario three (3) values are used to represent Red, Green and Blue colour intensity at the pixel.

Scene modelling, which covers both background modelling and foreground modelling, involves modelling visual content of a scene, based on an image sequence depicting the scene. A usage of scene modelling is foreground segmentation by background subtraction. Foreground segmentation may also be described by its inverse (i.e., background segmentation). Examples of foreground segmentation applications include activity detection, unusual object or behaviour detection, and scene analysis.

Foreground segmentation allows a video analysis system to distinguish between transient foreground objects and the non-transient background, through scene modelling of the non-transient background, and a differencing operation between that background and incoming frames of video. Foreground segmentation can be performed by using scene modelling and identifying portions of the modelled scene which are either moving, or recently changed/added, or both.

To model a scene captured by a video camera, for example, the content of a captured image is often divided into one or more visual elements, and a model of the appearance of each visual element is determined. A scene model may maintain a number of models for each visual element location, each of the maintained models representing different modes of appearance at each location within the scene model. Each of the models maintained by a scene model may be known as "mode model". For example, there might be one mode model for a visual element in a scene with a light being on, and a second mode model for the same visual element at the same location in the scene with the light off.

The description of a mode model may be compared against the description of an incoming visual element at the corresponding location in an image of the scene. The description may include, for example, information relating to pixel values or DCT coefficients. If the description of the incoming visual element is similar to one of the mode models, then temporal information about the mode model, such as age of the mode model, helps to produce information about the scene. For example, if an incoming visual element has the same description as a very old visual element mode model, then the visual element location can be considered to be established background. If an incoming visual element has the same description as a young visual element mode model, then the visual element location might be considered to be background or foreground depending on a threshold value. If the description of the incoming visual element does not match any known mode model, then the visual information at the mode model location has changed and the location of the visual element can be considered to be foreground.

Depending on the scene modelling method, a visual element can refer to a single pixel, an M×N block of pixels or a group of connected pixels (also known as a superpixel). The visual element location can refer to the location of a single pixel, or the location of the top-left corner of each M×N block of pixels or the centroid location of the group of connected pixels. The description of the visual element may contain but not be limited to the average colour intensities observed at the visual element, and/or a set of texture measures around the visual element. In general, any set of features computed over the visual element can be used to describe the visual element.

Scene modelling maintains a number of mode models per visual element; each corresponding to a description of the visual element. Some of these mode models describe the non-transient part of the scene, also known as the background. Other mode models describe the transient part of the scene, also known as the foreground. A dynamic scene modelling method also updates these mode models using the visual properties of incoming images. This updating step ensures the scene model is up to date with the dynamic changes happening in the scene including but not limited to illumination changes, or permanent changes to the background content such as addition, removal or one-off movement of fixed objects.

In one scene modelling method, a mixture of Gaussian (MoG) modes is used to describe the intensity values at each pixel. Each Gaussian in the mixture is represented by an average $\mu$, a standard deviation $\sigma$ and a mixture weight $\omega$. The sum of all mixture weights for each MoG equals to one. At each pixel location, the incoming intensity is matched to all Gaussians in the mixture. If the distance between the incoming intensity I and the Gaussian mode is within 2.5 standard deviation of a Gaussian distribution $|I-\mu| \leq 2.5\sigma$, the incoming intensity is said to match the Gaussian mode. The incoming intensity I is then used to update all matched modes, where the amount of update is inversely proportional to how close I is to the mode average $\mu$. This update scheme, which updates multiple modes at a time, can potentially bring two modes closer to each other to a point where the two modes have similar averages. Such converged modes result in waste of memory due to mode duplication. If the two modes are a foreground and a background mode, mode convergence causes foreground colour bleeding into the background or vice versa. Bleeding of foreground colour into the dominant background mode is visually noticeable as ghosts in the background image.

In another MoG scene modelling method, mode convergence is reduced by updating only the closest mode if the incoming intensity is inside the 99% confidence interval of the closest mode. If none of the modes are updated, the mode with the largest variance (i.e. least confident) is replaced with a new Gaussian mode centred at the incoming intensity. This closest mode update scheme results in multiple non-overlapping Gaussian distributions with narrow standard deviation. As a result, modes are less likely to merge but at a cost of more memory to store spurious modes in between the dominant background and foreground intensities. In particular, three to five modes are used in normal cases, and more modes are required in more dynamic scenes. If each mode requires three images (μσ, ω) in double-precision format, memory to accommodate nine (9) to fifteen (15) floating-point images is required in total.

In yet another scene modelling method, only one mode is modelled. The single mode is updated using background-classified intensities only. This single mode can model the background image well if the single mode is initialised with a clean background and the background remains static the whole time. The single mode model is also memory efficient. However, if part of the background changes, for example a long-term stationary object like a car moves away after initialisation, the new background behind the change will forever be detected as foreground. This foreground detection is commonly known as the permanent ghost problem.

None of the above-mentioned scene modelling methods can be both memory efficient and produce an artefact-free background image. In addition to correct foreground segmentation, an artefact-free background image is important in many applications such as free-viewpoint video synthesis from multiple fixed-viewpoint video streams. Hence, there is a need for a scene modelling method which has relatively low storage and computation cost as well as accurate foreground segmentation and artefact-free background extraction.

SUMMARY OF THE INVENTION

It is an object of the present invention to substantially overcome, or at least ameliorate, one or more disadvantages of existing arrangements.

According to one aspect of the present disclosure, there is provided a method of modifying a scene model for a sequence of input images, said method comprising:

receiving a plurality of scene modes associated with the sequence;

selecting, for each of a plurality of image pixels in an input image of the sequence, two scene modes from the received plurality of scene modes, the scene modes being selected based on distances between colour value of the image pixel and colour values of the scene modes at a corresponding pixel location;

determining if the image pixel colour value matches the colour value of any of the selected scene modes based on distance between the image pixel colour value and the colour value of a selected scene mode compared to a predetermined threshold;

determining if the image pixel colour value is a mixture of the colour values of the selected scene modes based on distances and colour angles between the image pixel colour value and the colour values of the selected scene modes; and modifying the colour value of a closest selected scene mode using the image pixel colour value if there is one matched mode and the image pixel colour value is not a mixture of the colour values of the selected scene modes, otherwise maintaining the colour values of said plurality of scene modes if the image pixel colour value matches the colour values of both selected modes or if the image pixel colour value is a mixture of the colour values of the selected scene modes.

According to another aspect of the present disclosure, there is provided an apparatus for modifying a scene model of a sequence of input images, the apparatus comprising:

units for receiving a plurality of scene modes associated with the sequence;

units for selecting, for each of a plurality of input image pixels in a frame of the video sequence, two scene modes from the received plurality of scene modes, the scene modes being selected based on distances between colour value of the image pixel and colour values of the scene modes at a corresponding pixel location;

units for determining if the image pixel colour value matches the colour value of any of the selected scene modes based on distance between the image pixel colour value and the colour value of a selected scene mode compared to a predetermined threshold;

units for determining if the image pixel colour value is a mixture of the colour values of the selected scene modes based on distances and colour angles between the image pixel colour value and the colour values of the selected scene modes; and units for modifying the colour value of a closest selected scene mode using the image pixel colour value if there is one matched mode and the image pixel colour value is not a mixture of the colour values of the selected scene modes, otherwise maintaining the colour values of said plurality of scene modes if the image pixel colour value matches the colour values of both selected modes or if the image pixel colour value is a mixture of the colour values of the selected scene modes.

According to still another aspect of the present disclosure, there is provided a system for modifying a scene model of a sequence of input images, the system comprising:

a memory for storing data and a computer program;

a processor coupled to the memory for executing the computer program, the computer program comprising instructions for:

receiving a plurality of scene modes associated with the sequence;

selecting, for each of a plurality of input image pixels in a frame of the video sequence, two scene modes from the received plurality of scene modes, the scene modes being selected based on distances between colour value of the image pixel and colour values of the scene modes at a corresponding pixel location;

determining if the image pixel colour value matches the colour value of any of the selected scene modes based on distance between the image pixel colour value and the colour value of a selected scene mode compared to a predetermined threshold;

determining if the image pixel colour value is a mixture of the colour values of the selected scene modes based on distances and colour angles between the image pixel colour value and the colour values of the selected scene modes; and modifying the colour value of a closest selected scene mode using the image pixel colour value if there is one matched mode and the image pixel colour value is not a mixture of the colour values of the selected scene modes, otherwise maintaining the colour values of said plurality of scene modes if the image pixel colour value matches the colour values of both selected modes or if the image pixel colour value is a mixture of the colour values of the selected scene modes.

According to another aspect of the present disclosure, there is provided a computer readable medium comprising a computer program stored on the medium for modifying a scene model of a sequence of input images, the program comprising:

code for receiving a plurality of scene modes associated with the sequence;

code for selecting, for each of a plurality of input image pixels in a frame of the video sequence, two scene modes from the received plurality of scene modes, the scene modes being selected based on distances between colour value of the image pixel and colour values of the scene modes at a corresponding pixel location;

code for determining if the image pixel colour value matches the colour value of any of the selected scene modes based on distance between the image pixel colour value and the colour value of a selected scene mode to a predetermined threshold;

code for determining if the image pixel colour value is a mixture of the colour values of the selected scene modes based on distances and colour angles between the image pixel colour value and the colour values of the selected scene modes; and modifying the colour value of a closest selected scene mode using the image pixel colour value if there is one matched mode and the image pixel colour value is not a mixture of the colour values of the selected scene modes, otherwise maintaining the colour values of said plurality of scene modes if the image pixel colour value matches the colour values of both selected modes or if the image pixel colour value is a mixture of the colour values of the selected scene modes.

Other aspects of the invention are also disclosed.

BRIEF DESCRIPTION OF THE DRAWINGS

One or more embodiments of the invention will now be described with reference to the following drawings, in which:

FIGS. 1, 2A and 2B collectively form a schematic block diagram representation of a camera system upon which described arrangements can be practiced;

DETAILED DESCRIPTION OF EMBODIMENTS OF THE INVENTION

Figure 2A:
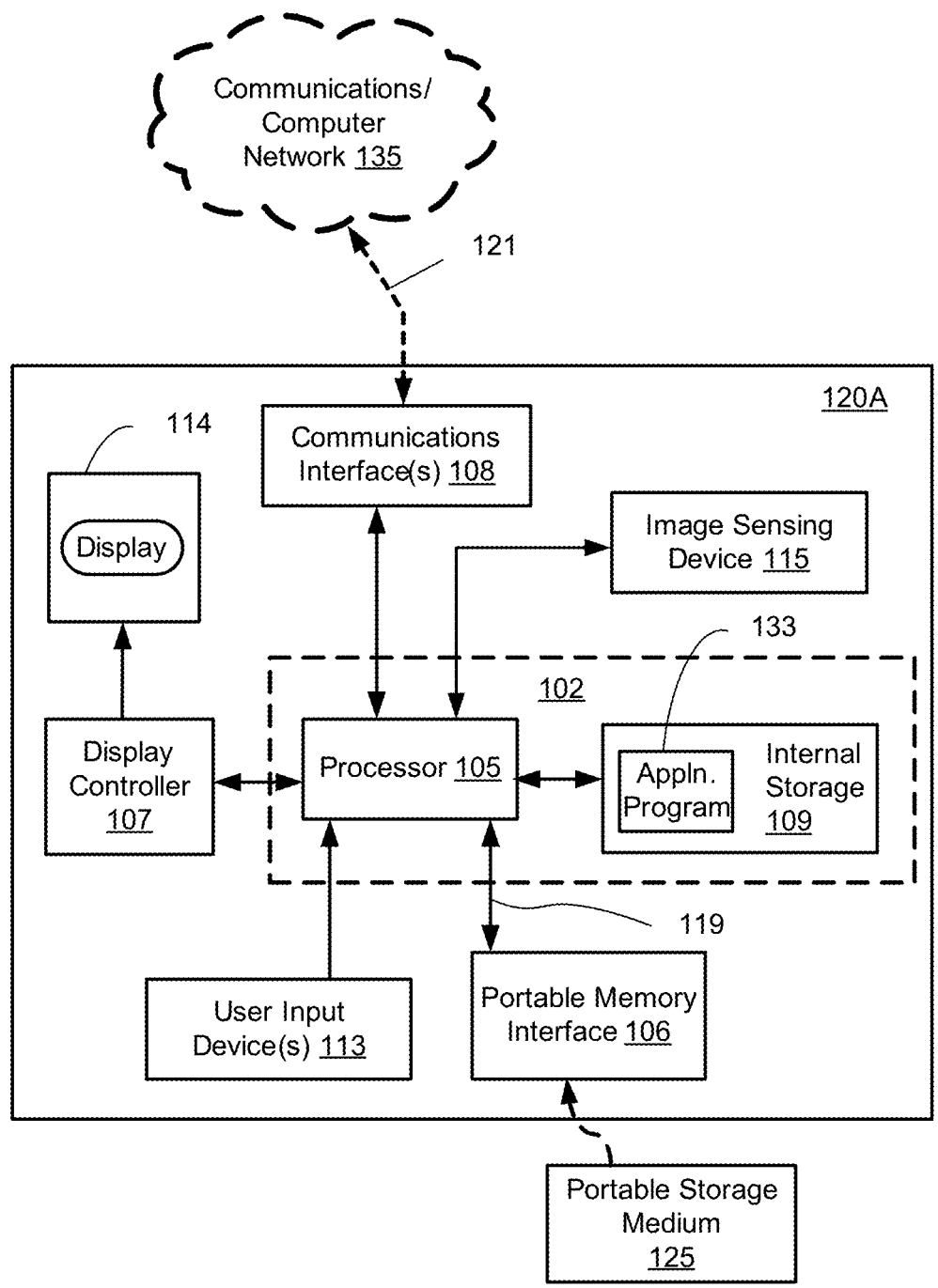

Where reference is made in any one or more of the accompanying drawings to steps and/or features that have the same reference numerals, those steps and/or features have for the purposes of this description the same function(s) or operation(s), unless the contrary intention appears.

A computer-implemented method of modifying a scene model is described below. The modified scene model may then be used in processing a video sequence comprising a plurality of images.

The video sequence may be captured using a network of cameras. The network of cameras may be set up around a region of interest (ROI), to capture live images of a scene within the ROI for broadcast. As described, the network of cameras may be part of a large computer vision system used to generate free viewpoint video (FVV). The FVV system is capable of processing video in real time and generating virtual video footage of the scene suitable for broadcast with a low latency.

The cameras may surround the ROI, for example, in one or more rings of cameras at different of heights. The cameras may be evenly spread around the ROI or there may be a larger density of cameras from particular locations. Alternatively, the locations may be randomly spread. The cameras may be limited to locations on one side of the ROI, or limited due to the physical surrounding of the ROI.

As described below, the cameras are mounted and fixed. However, in alternative arrangements the cameras may be capable of pan, tilt and zoom (PTZ) and may be hand held and mobile. In order to produce FVV, the system may require either stabilised frames from the captured video or accurate calibration data associated with each frame. The data associated with each frame may include the effect of any temporal variation in the camera capture. Such temporal variation in the camera capture may be either controlled (e.g. by an operator or some kind of automated control system) or may be due to mechanical or optical instability in a camera. The instability may include vibrations, hand shake, or slow drifts such as due to environmental changes such as temperature, air pressure, wind, crowd motion, etc.

For example, a sports venue or stadium may have a large number of cameras (e.g., ten (10) or more cameras, or a hundred (100) or more cameras) with fixed PTZ directed in towards a playing area. The playing area is often approximately rectangular, circular or oval, allowing the playing area to be surrounded by one or more rings of cameras so that all points on a field within the playing area are captured simultaneously from a large number of viewpoints. In some arrangements, a full ring of cameras may not be employed but rather some subset(s) of the full perimeter of cameras may be used. An arrangement where one or more subsets of the full perimeter of cameras are used may be advantageous when certain viewpoints are known to be unnecessary ahead of time.

As described below, the cameras are synchronised to acquire frames at the same instants in time. The cameras may be roughly set up at different heights (e.g. in three (3) rings at different heights) and may focus on specific preselected areas of the playing field. In one arrangement, the image features used for stabilisation may be line like field markings. The stabilisation methods being used should be robust to dynamic occlusions such as players moving on the field and crowd movements in stands surrounding the playing fields. The stabilisation methods should also handle periodic structures like parallel line markings.

In an alternative arrangement, the network of cameras described above may be configured to capture images of a stage at a performance venue. For example, a set of ten or more cameras may be directed in towards the stage from various directions in front of a performance. In such a stage arrangement, challenges may include changing scenery or equipment on the stage. The features in such a stage arrangement may be more varied than in a sports venue.

The cameras used in the camera network may be traditional live broadcast type cameras, digital video cameras, surveillance cameras, or other devices with imaging capability such as a mobile phone, tablet, computer with webcam, etc. As described below, methods described below are used for processing high definition (HD) video frames. However, all the methods described can be adapted to other frame formats such as SD, 4K or 8K.

FIG. 1 illustrates a system 100 to modify a scene model of a sequence of input images. As described above, the described methods are adapted for use in the context of a sports or similar performance arena, such as arena 110 shown in FIG. 1. The arena 110 has an oval playing field, and is surrounded by a ring of cameras 120A-120X. Each of the cameras 120A-120X is physically located at a respective predetermined location with respect to the arena 110. The arena 110, in the example of FIG. 1, contains players from a first team (e.g. 150) and a second team (e.g. 160) and a ball 140. In the example of FIG. 1, the player 150 may be represented by a first object, the player 160 may be represented by a second object and the ball 140 by a third object.

Video frames captured by a camera, such as the camera 120A, are subject to processing and temporary storage near the camera 120A prior to being made available via a network connection 130 to a video processing unit 170. The video processing unit 170 receives controlling input from controller 180 that specifies the position of a virtual camera within the arena 110. The role of the video processing unit 170 is to synthesise a specified camera viewpoint 190 based on the video streams available to the processing unit 170 from the cameras 120 surrounding the arena 110.

The virtual camera position input may be generated by a human virtual camera operator and be based on input from a user interface device such as a joystick, mouse or similar controller including dedicated controllers comprising multiple input components. Alternatively, the camera position may be generated fully automatically based on analysis of game play. Hybrid control configurations are also possible where some aspects of the camera positioning are directed by a human operator and others by an automated algorithm. For example, coarse positioning may be performed by a human operator and fine positioning, including stabilisation and path smoothing, may be performed by an automated algorithm.

The processing unit 170 may be configured to achieve frame synthesis using any suitable image based rendering method. In addition to rendering a requested frame, the processing unit 170 may be additionally configured to perform synthesis, in-painting or interpolation of regions as required to create frames of high quality visual appearance. The processing unit 170 may also be configured to provide feedback in the form of the frame quality or the completeness of camera coverage for the requested viewpoint so that the device generating the camera position control signal can be aware of the practical bounds of the processing unit 170. Video streams created by the video processing unit 170 may be subsequently provided to a production desk where the video streams can be edited together to form a broadcast video.

Figure 2B:
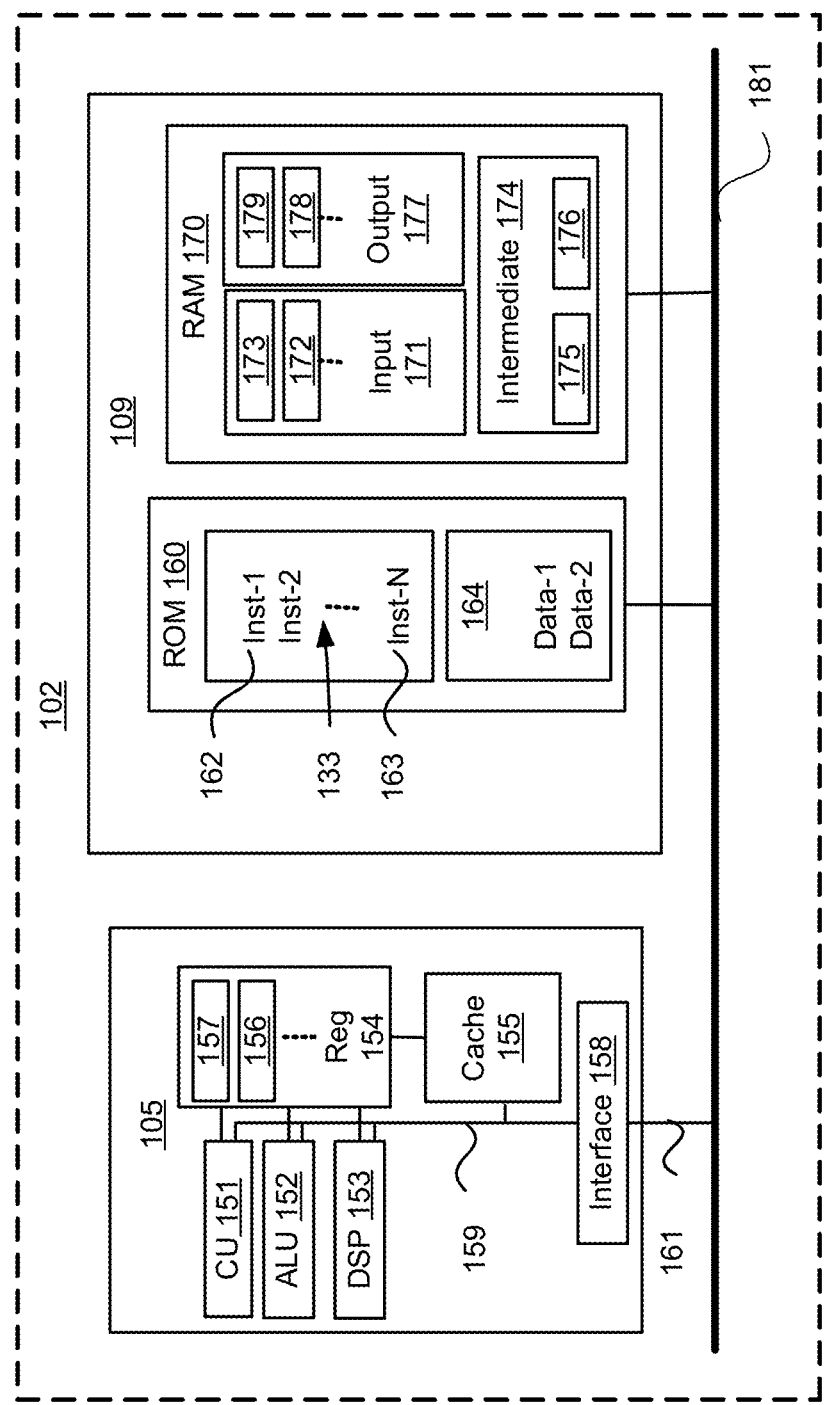

FIGS. 2A and 2B collectively form a schematic block diagram of a camera system forming the camera 120A. The other cameras 120B to 120X have a similar configuration to the camera 120 and, as such, will not be explicitly described.

The camera 120A includes embedded components, upon which methods of modifying a scene model to be described are desirably practiced. The camera 120A may be any suitable apparatus such as, for example, a digital camera or a mobile phone, in which processing resources are limited. One advantage of analysis at or near the camera 120A, for example, is the potential for reduced latency. Nevertheless, the methods to be described may also be performed on higher-level devices such as desktop computers, server computers, and other such non-local processing unit devices with significantly larger processing resources.

Although the methods described below are described as being implemented on the camera 120A. The methods may be implemented on any one or more of the cameras 120B to 120X.

The camera 120A is used to capture input images representing visual content of a scene appearing in the field of view (FOV) of the camera 120A. Each image captured by the camera 120A comprises a plurality of visual elements. A visual element is defined as an image sample. In one arrangement, the visual element is a pixel, such as a Red-Green-Blue (RGB) pixel. In another arrangement, each visual element comprises a group of pixels. In yet another arrangement, the visual element is an 8 by 8 block of transform coefficients, such as Discrete Cosine Transform (DCT) coefficients as acquired by decoding a motion-JPEG frame, or Discrete Wavelet Transformation (DWT) coefficients as used in the JPEG-2000 standard. The colour model is YUV, where the Y component represents luminance, and the U and V components represent chrominance.

As seen in FIG. 2A, the camera 120A comprises an embedded controller 102. In the present example, the controller 102 has a processing unit (or processor) 105 which is bi-directionally coupled to an internal storage module 109. The storage module 109 may be formed from non-volatile semiconductor read only memory (ROM) 160 and semiconductor random access memory (RAM) 170, as seen in FIG. 2B. The RAM 170 may be volatile, non-volatile or a combination of volatile and non-volatile memory.

The camera 120A includes a display controller 107, which is connected to a display 114, such as a liquid crystal display (LCD) panel or the like. The display controller 107 is configured for displaying graphical images on the display 114 in accordance with instructions received from the controller 102, to which the display controller 107 is connected.

The camera 120A also includes user input devices 113 which are typically formed by a keypad or like controls. In some implementations, the user input devices 113 may include a touch sensitive panel physically associated with the display 114 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 2A, the camera 120A also comprises a portable memory interface 106, which is coupled to the processor 105 via a connection 119. The portable memory interface 106 allows a complementary portable memory device 125 to be coupled to the camera 120A to act as a source or destination of data or to supplement the internal storage module 109. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The camera 120A also has a communications interface 108 to permit coupling of the camera 120A to a computer or communications network 135 via a connection 121. The connection 121 may be wired or wireless. For example, the connection 121 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the controller 102, in conjunction with an image sensing device 115, is provided to perform the functions of the camera 120A. The image sensing device 115 may include a lens, a focus control unit and an image sensor. In one arrangement, the sensor is a photo-sensitive sensor array. As another example, the camera 120A may be a mobile telephone handset. In this instance, the image sensing device 115 may also represent those components required for communications in a cellular telephone environment. The image sensing device 115 may also represent a number of encoders and decoders of a type including Joint Photographic Experts Group (JPEG), (Moving Picture Experts Group) MPEG, MPEG-1 Audio Layer 3 (MP3), and the like. The image sensing device 115 captures an input image and provides the captured image as an input image.

Figure 3:
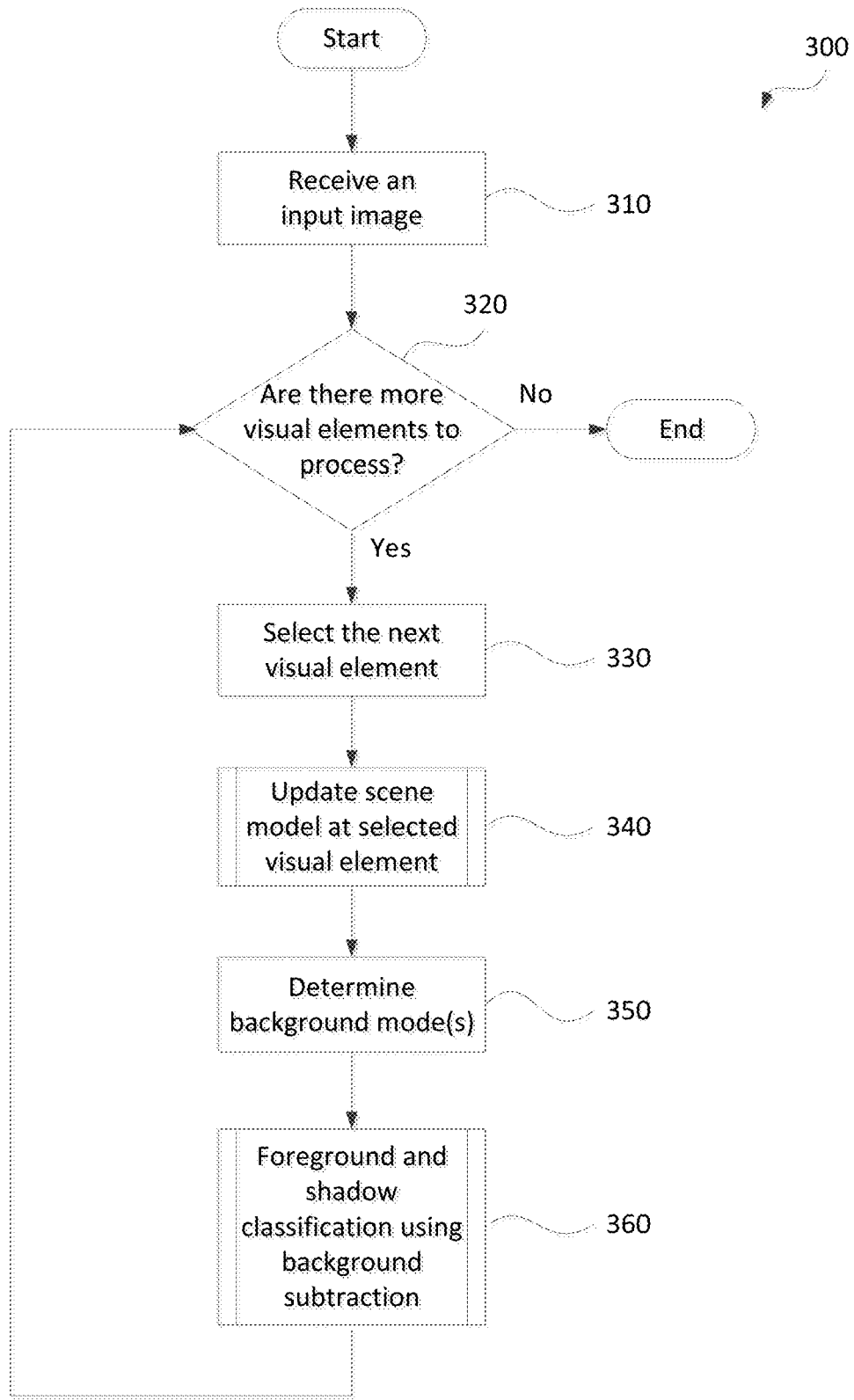
FIG. 3 is a schematic flow diagram showing a method of modifying a scene model for a foreground and background segmentation of an input image.
Figure 4A:
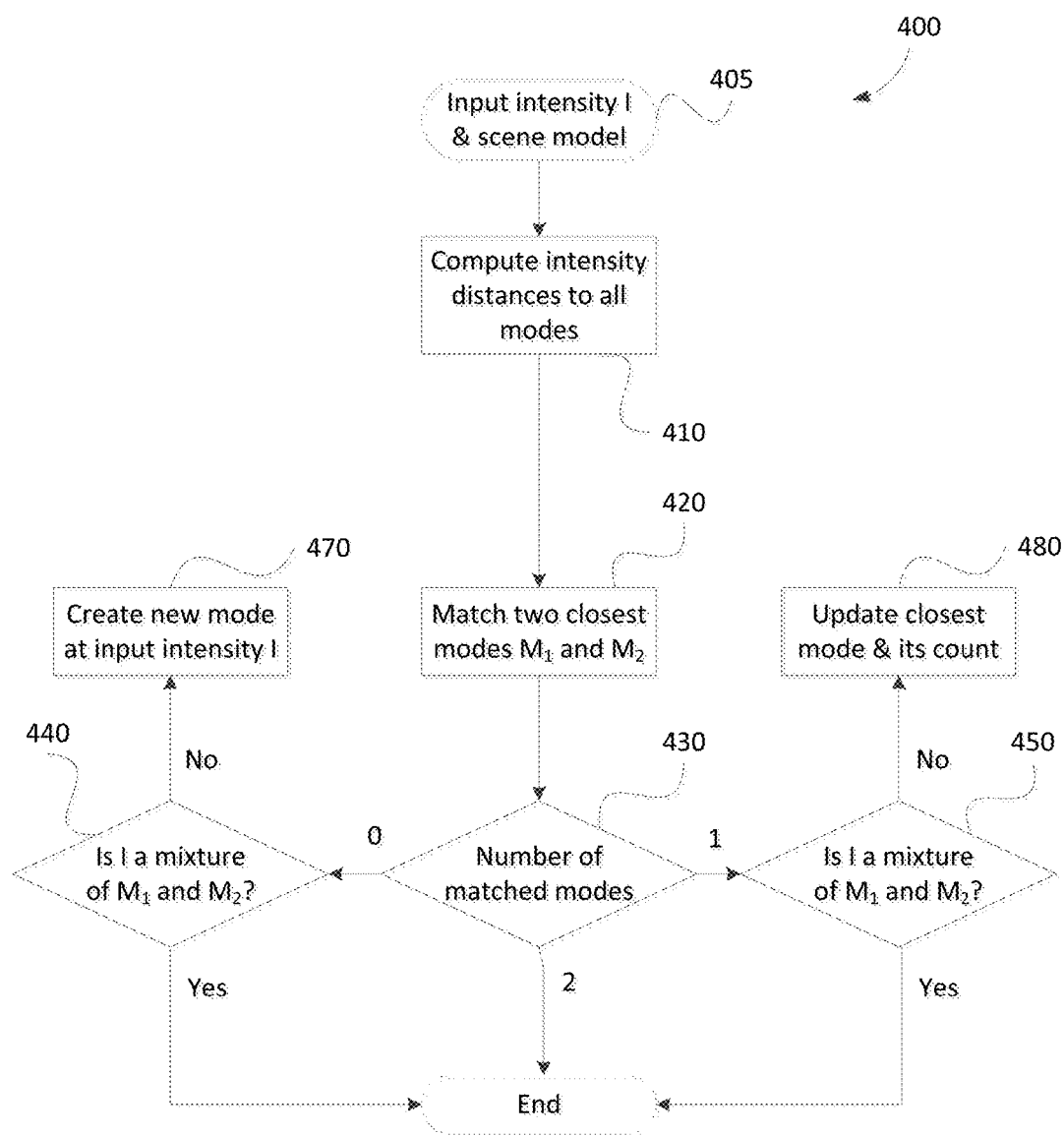
FIG. 4A is a schematic flow diagram showing a method of updating a scene model at a visual element location with an input intensity.

The methods described below may be implemented using the embedded controller 102, where the processes of FIGS. 3 to 5 may be implemented as one or more software application programs 133 executable within the embedded controller 102. The camera 120A of FIG. 2A implements the described methods. In particular, with reference to FIG. 2B, the steps of the described methods are effected by instructions in the software 133 that are carried out within the controller 102. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 133 of the embedded controller 102 is typically stored in the non-volatile ROM 160 of the internal storage module 109. The software 133 stored in the ROM 160 can be updated when required from a computer readable medium. The software 133 can be loaded into and executed by the processor 105. In some instances, the processor 105 may execute software instructions that are located in RAM 170. Software instructions may be loaded into the RAM 170 by the processor 105 initiating a copy of one or more code modules from ROM 160 into RAM 170. Alternatively, the software instructions of one or more code modules may be pre-installed in a non-volatile region of RAM 170 by a manufacturer. After one or more code modules have been located in RAM 170, the processor 105 may execute software instructions of the one or more code modules.

The application program 133 may be pre-installed and stored in the ROM 160 by a manufacturer, prior to distribution of the camera 120A. However, in some instances, the application programs 133 may be supplied to the user encoded on one or more CD-ROM (not shown) and read via the portable memory interface 106 of FIG. 1 prior to storage in the internal storage module 109 or in the portable memory 125. In another alternative, the software application program 133 may be read by the processor 105 from the network 135, or loaded into the controller 102 or the portable storage medium 125 from other computer readable media. Computer readable storage media refers to any non-transitory tangible storage medium that participates in providing instructions and/or data to the controller 102 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the camera 120A. Examples of transitory or non-tangible computer readable transmission media that may also participate in the provision of software, application programs, instructions and/or data to the camera 120A include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 133 and the corresponding code modules mentioned above may be executed to implement one or more graphical user interfaces (GUIs) to be rendered or otherwise represented upon the display 114 of FIG. 2A. Through manipulation of the user input device 113 (e.g., the keypad), a user of the camera 120A and the application programs 133 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 2B illustrates in detail the embedded controller 102 having the processor 105 for executing the application programs 133 and the internal storage 109. The internal storage 109 comprises read only memory (ROM) 160 and random access memory (RAM) 170. The processor 105 is able to execute the application programs 133 stored in one or both of the connected memories 160 and 170. When the camera 120A is initially powered up, a system program resident in the ROM 160 is executed. The application program 133 permanently stored in the ROM 160 is sometimes referred to as "firmware". Execution of the firmware by the processor 105 may fulfil various functions, including processor management, memory management, device management, storage management and user interface.

The processor 105 typically includes a number of functional modules including a control unit (CU) 151, an arithmetic logic unit (ALU) 152 and a digital signal processor (DSP) 153. The units 151 and 152 are coupled to a local or internal memory comprising a set of registers 154 which typically contain atomic data elements 156, 157, along with internal buffer or cache memory 155. One or more internal buses 159 interconnect these functional modules including the units 151 and 152 as well as DSP 153. The processor 105 typically also has one or more interfaces 158 for communicating with external devices via system bus 181, using a connection 161.

The application program 133 includes a sequence of instructions 162 through 163 that may include conditional branch and loop instructions. The program 133 may also include data, which is used in execution of the program 133. This data may be stored as part of the instruction or in a separate location 164 within the ROM 160 or RAM 170.

In general, the processor 105 is given a set of instructions, which are executed therein. This set of instructions may be organised into blocks, which perform specific tasks or handle specific events that occur in the camera 120A. Typically, the application program 133 waits for events and subsequently executes the block of code associated with that event. Events may be triggered in response to input from a user, via the user input devices 113 of FIG. 2A, as detected by the processor 105. Events may also be triggered in response to other sensors and interfaces in the camera 120A.

The execution of a set of the instructions may require numeric variables to be read and modified. Such numeric variables are stored in the RAM 170. The disclosed method uses input variables 171 that are stored in known locations 172, 173 in the memory 170. The input variables 171 are processed to produce output variables 177 that are stored in known locations 178, 179 in the memory 170. Intermediate variables 174 may be stored in additional memory locations in locations 175, 176 of the memory 170. Alternatively, some intermediate variables may only exist in the registers 154 of the processor 105.

The execution of a sequence of instructions is achieved in the processor 105 by repeated application of a fetch-execute cycle. The control unit 151 of the processor 105 maintains a register called the program counter, which contains the address in ROM 160 or RAM 170 of the next instruction to be executed. At the start of the fetch execute cycle, the contents of the memory address indexed by the program counter is loaded into the control unit 151. The instruction thus loaded controls the subsequent operation of the processor 105, causing for example, data to be loaded from ROM memory 160 into processor registers 154, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 133, and is performed by repeated execution of a fetch-execute cycle in the processor 105 or similar programmatic operation of other independent processor blocks in the camera 120A.

A dynamic scene typically contains a fixed background and occasionally some moving objects in the foreground. The segmentation of these foreground objects from a background model is a task that is required by many applications. Most video analytics applications, for example, analyse the information about the foreground objects including but not limited to their sizes, shapes, moving directions, speeds, motion patterns and interactions. Other visualisation applications such as free-viewpoint video also use the clean background without the foreground objects for new view synthesis.

Foreground segmentation from a video is often achieved using background modelling, or more generally, scene modelling, where the appearances of both the background (BG) and foreground (FG) are modelled. A multi-mode scene model, for example, models the captured intensities of a scene from a video using multiple modes at each pixel (or other visual element such as DCT block, or superpixel). Each mode corresponds to a frequently seen intensity at that pixel (e.g., the intensity of a static background), a couple of intensities from a dynamic background texture (waving tree, ripple water . . . ), or the intensity of foreground objects passing by. When a new video frame is available, the input pixel intensity is matched against all modes. If there is a sufficiently close mode, the matched mode is updated towards the input intensity. Otherwise, the input intensity claims a new mode, replacing the least frequently seen mode. Once a background image (or a set of background images in case of a more dynamic background) is estimated, foreground pixels can be detected as pixels whose input intensity significantly differs from the intensity of the estimated background at the same location (or from a plurality of background intensities around the same location).

The problem with the above-mentioned dynamic background update is that if the input intensity matches two or more scene modes, the matched modes will be pulled closer to each other. If the two concerned modes involve a background mode and a foreground mode, this gravitational attraction means the foreground intensity slowly bleeds into the background model, causing "ghosts" (i.e., a faint version of a moving foreground object in the background image). The background corruption is not only undesirable visually; the background corruption may also lead to incorrect foreground segmentation under severe bleeding.

Intensities that match two scene modes usually lie in the middle of two close modes. Intensities that match two scene modes is often found at the boundary of a foreground object and the background due to the partial volume effect at that pixel. The intensity of the boundary pixel is therefore of mixed foreground-background intensity. If the foreground object is stationary or moves very slowly or if there are multiple foreground objects with the same colour moving all over the background with a flat colour (as in the case of team sport over a single-colour field), the contribution of these mixed intensity can build up, resulting in ghosting artefact.

Mode bleeding can be reduced by enforcing a minimum distance between any two modes so that no two modes can merge with each other. A minimum distance between any two modes can be achieved by not updating either mode when an input intensity matches both modes. However, this rule excludes most mixed intensity pixels at the boundary of an established foreground object and the background.

A method 300 of modifying a scene model for a foreground and background segmentation of an input image captured by the camera 120A, will now be described with reference to FIG. 3. The method 300 outputs a foreground and shadow segmentation using background subtraction. The method 300 may be implemented as one or more software code modules of the software application program 133 resident in the storage module 109 and being controlled in its execution by the processor 105. As described below, the scene model is pixel-based but can be implemented as block-based or superpixel-based.

The method 300 begins at receiving step 310 where an input image is received from the image sensing device 115 under execution of the processor 105. After receiving the input image, the method 300 moves to step 320. The input image may be stored in RAM 170.

Then at decision step 320, if there are more visual elements in the input image to be processed, then the method 300 moves to select the next visual element in selecting step 330. For pixel-based scene modelling, the method 300 can visit the pixel visual elements in the input image in a scanline manner. Starting at the top-left pixel in the first image row, pixels are processed in an image row from left to right until the end of the row. The next image row is then processed from top to bottom until the last image row is visited. Alternatively, the input image can be partitioned into image blocks, where each block is processed in a scan-line manner by a single processor in a multi-processor or multi-threading hardware environment. If there are no more visual elements in the input image to be processed at step 320, then the foreground segmentation method 300 ends.

After a visual element is selected to be processed in step 330, the scene model at the selected visual element is updated at step 340, under execution of the processor 105. A method 400 of updating the scene model, as executed at step 340, will be described below with reference to FIG. 4A. A multi-mode scene model is used at each visual element. An input intensity from the input image at the location of the selected visual element updates at most one matched mode in the scene model. Each mode is then labelled as either background mode or other mode in determining step 350 depending on a predetermined criteria such as a match count for that mode. For example, if the mode has been matched by input intensities of incoming frames by more than N times with a sufficiently large N, then the mode can be classified as background. The classification of the mode in this manner assumes that the moving foreground objects only occupy a pixel for a short amount of time, while the fixed background can be seen at that pixel for a substantial number of times. At the location of each visual element, more than one mode can be classified as background to handle dynamic background texture such as rippling water or swaying tree leaves.

Once a set of background modes are determined in step 350, the input visual element can be classified as either foreground, shadow or background using background subtraction step 360, under execution of the processor 105. A method 500 of classifying visual elements, as executed at step 360, will be described below with reference to FIG. 5. Once all visual elements from the input image are processed, the method 300 outputs a current background model, a segmentation of the input image into background, foreground, or shadow pixels, and any extra information such as statistical models of the foreground objects and/or background blocks. The extra information may be useful for visual analysis of the moving foreground objects such as sport analytics. The current background model output by the method 300 may contain multiple background images in case of dynamic background texture.

The method 400 of updating the scene model of a visual element, as executed at step 340, will now described with reference to FIG. 4A. The method 400 may be implemented as one or more software code modules of the software application program 133 resident in the storage module 109 and being controlled in its execution by the processor 105.

The method 400 begins at inputting step 405, where an input intensity I and a scene model comprising a set of scene modes is received, under execution of the processor 105. The input intensity is then compared to the intensities of all scene modes at the same location in comparing step 410. Then at matching step 420, two closest modes $M_1$ and $M_2$ are determined, under execution of the processor 105.

At decision step 430, the number of matched modes from the two closest modes determined at step 420 is counted. If none of the two closest modes matches, then the method 400 proceeds to testing step 440 where a test is performed to determine if the input intensity I is a mixture of intensities of the two modes $M_1$ and $M_2$.

If the input intensity I is a mixture of intensities of the two modes $M_1$ and $M_2$ at step 440, then the mixed intensity I is not used to update or create any new mode and the method 400 concludes. Otherwise, the method 400 proceeds to creating step 470 where a new mode is created at the input intensity I.

Returning to decision step 430, if only one of the two closest modes matches, then the method 400 proceeds to decision step 450. If the input intensity I is a mixture of intensities of the two modes $M_1$ and $M_2$, at step 450, then the mixed intensity I is not used to update or create any new mode and the method 400 concludes. Otherwise, the method 400 proceeds to updating step 480 where I is used to update its closest matched mode.

Finally at decision step 430, if the input intensity I matches both closest modes, then I is not used to update or create any more mode and the method 400 concludes.

In step 420, the intensity I is said to match a mode M if the intensity distance |I-M| is less than a matching threshold $T_{match}$. If a full Gaussian model $N(\mu,\sigma)$ is used to model each mode, then the matching threshold is often set to be a fixed multiple of the standard deviation, (e.g., $T_{match}=2.5\times\sigma$) so as to capture 99.96% of samples of the Gaussian distribution. However, to save memory (i.e., one $\sigma$ per pixel), a predetermined fixed matching threshold may be used over the whole image (e.g., $T_{match}=10$ for 8-bit intensity dynamic range). The predetermined fixed matching threshold may be learnt from the scene during an initialisation phase. In one arrangement, a fixed multiple of the standard deviation of noise in the image $T_{match}=2.5\times\sigma_{noise}$ is used as the fixed matching threshold.

By not doing an update if both closest modes match the input intensity I, the intensity distance between two modes is already close: (i.e., $|M_1-M_2|<2\times T_{match}$). As a result, the mode intensities are further apart (i.e., more than $2\times T_{match}$). For many scenes, such as professional sport, the minimum mode separation is guaranteed because foreground colours (e.g., sportsman jerseys) are usually very different from background colours (i.e., stadium pitch). If the scene modes are initialised with a minimum separation distance above $2\times T_{match}$, then the method 400 may maintain this minimum separation.

In step 440 and 450, the input intensity I is said to be a mixture of intensities of the two modes $M_1$ and $M_2$ if I lies in a spectrum of intensities (or colours) in between $M_1$ and $M_2$. As seen in FIGS. 4B, 4C, 4D and 4E, the colour spectrum is illustrated as a dashed 'rugby-ball' shaped region 445, 455, 485 and 475, respectively.

In a more mathematical description, the input intensity, I, is a mixture of $M_1$ and $M_2$ if the projection of I along a line connecting $M_1$ and $M_2$ lies in between $M_1$ and $M_2$ on that line. In addition, the colour angle $<I\ M_1\ M_2>$ and $<I\ M_2\ M_1>$ is smaller than an angle threshold $T_{angle}$ (e.g., $T_{angle}=10°$). This angle threshold defines arc boundaries of the rugby-ball shaped regions 445, 455, 475 and 485. The angle tolerance $T_{angle}$ allows for measurement noise in the input intensity I and intensities of modes $M_1$ and $M_2$. Such a mathematical definition of mixed intensity applies to both scalar intensity (grayscale) and vector intensity (colour).

Visual illustrations of different examples of the relative value of the input intensity I with respect to the two closest intensities $M_1$ and $M_2$ are seen in FIGS. 4B, 4C, 4D and 4E.

Figure 4B:
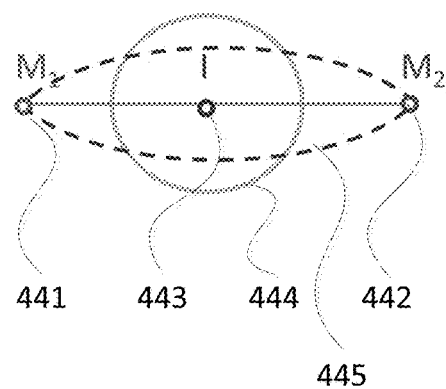
FIG. 4B shows an example of no matched mode and intensity being a mixture of modes.
Figure 5:
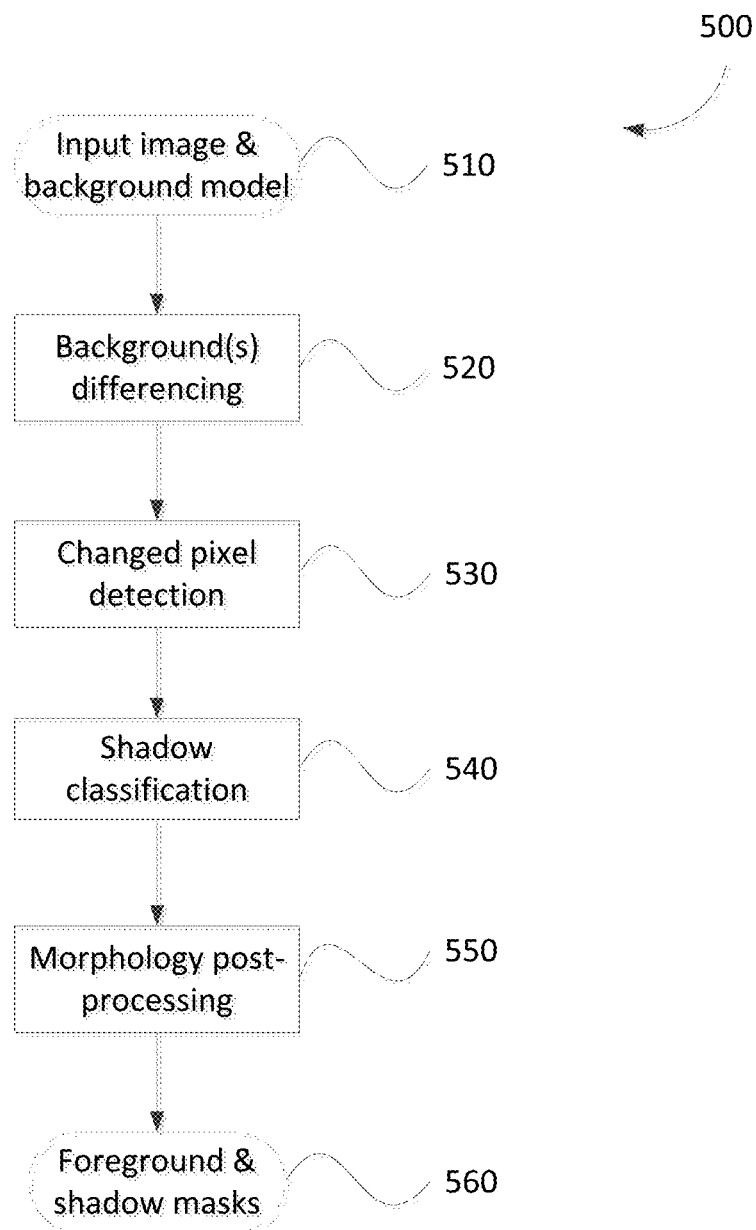
FIG. 5 is a schematic flow diagram of a method of detecting foreground and shadow pixels from an input image using background subtraction.

FIG. 4B corresponds to the case of no matched mode and I being a mixture of $M_1$ and $M_2$. In the example of FIG. 4B, the two modes $M_1$, 441, and $M_2$, 442 are outside the circular matching area, 444, of the input intensity I, 443. The radius of this matching circle is $T_{match}$ as described earlier. In FIG. 4B, the mixed intensity I, 443, is depicted to lie inside the rugby-shaped region 445 spanning the two extreme intensities $M_1$, 441, and $M_2$, 442. Because the input intensity I is simply a mixture of the two modes $M_1$ and $M_2$, the input intensity I likely comes from the boundary pixels between the two objects corresponding to $M_1$ and $M_2$. No new mode is therefore created for the mixed intensity I example of FIG. 4B in accordance with the method 400.

Figure 4C:
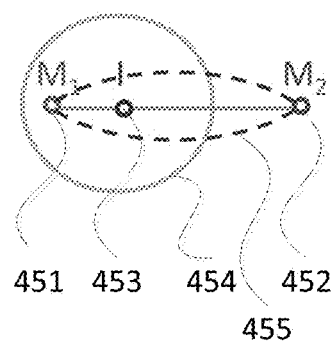
FIG. 4C shows an example of one matched mode and intensity being a mixture of modes.
Figure 4D:
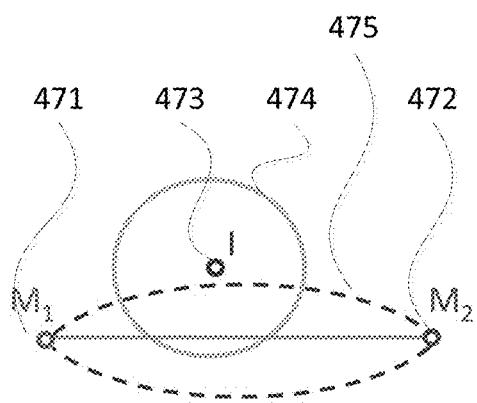
FIG. 4D shows an example of no matched mode where I is not a mixture of modes.

FIG. 4D corresponds to the case of no matched mode where I is not a mixture of modes $M_1$ and $M_2$. In the example of FIG. 4D, the two modes $M_1$, 471, and $M_2$, 472, are outside the circular matching area, 474, of the input intensity I, 473. The input intensity I, 473, lies outside the rugby-ball shaped region 475 spanning the two extreme intensities $M_1$, 471, and M$_2$, 472. Since I is a newly seen intensity, not a mixture of the existing modes M$_1$ and M$_2$, a new mode is created at the input intensity I in accordance with the method 400.

FIG. 4C corresponds to the case of exactly one matched mode and intensity, I, being a mixture of modes M$_1$ and M$_2$. In the example of FIG. 4C, the matching mode M$_1$, 451, is inside the circular matching area, 454, of the input intensity I, 453; and the non-matching mode M$_2$, 452, is outside the circular matching area, 454, of the input intensity I, 453; and the input intensity I, 453, lies inside the rugby-ball shaped region 455 spanning the two extreme intensities M$_1$, 451, and M$_2$, 452. Because the input intensity I is simply a mixture of the two modes M$_1$ and M$_2$ in the example of FIG. 4C, the input intensity I likely comes from the boundary pixels between the two objects corresponding to M$_1$ and M$_2$. The matched mode is therefore not updated, in accordance with the method 400, to avoid ghost due to mixed intensity corruption.

Figure 4E:
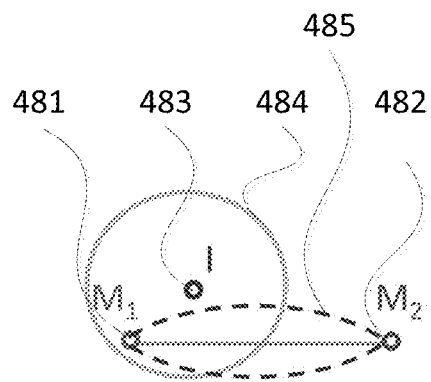
FIG. 4E shows an example of one matched mode where intensity I is not a mixture of modes.

FIG. 4E corresponds to the case of exactly one matched mode and intensity I not being a mixture of M$_1$ and M$_2$. In the example of FIG. 4E, the matching mode M$_1$, 481, is inside the circular matching area, 484, of the input intensity I, 483; and the non-matching mode M$_2$, 482 is outside the circular matching area, 484, of the input intensity I, 483; and the input intensity I, 483, lies outside the rugby-shaped region 485 spanning the two extreme intensities M$_1$, 481, and M$_2$, 482. Because the input intensity I is not a mixture of the existing modes M$_1$ and M$_2$, I is used to update the matched mode for the intensity I, which is M$_1$ in the example of FIG. 4E.

Figure 4F:
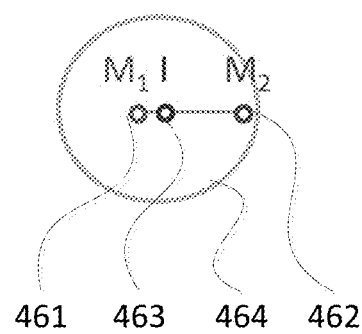
FIG. 4F corresponds to the case where input intensity I matches both modes.

FIG. 4F corresponds to the case where the input intensity I matches both modes M$_1$ and M$_2$. In the example of FIG. 4F, the two modes M$_1$, 461, and M$_2$, 462, lie inside the circular matching area, 464, of the input intensity I, 463. In the example of FIG. 4F, the two modes M$_1$ and M$_2$ are already too close and therefore neither mode gets updated in accordance with the method 400.

The update of a scene model with mode intensity μ by an input intensity I as in step 480 of FIG. 4 is described in more detail below. In one arrangement, a recursive weighted update is used, in which the mode intensity μ$_t$ at a current time instance t is determined as a weighted average between the input intensity I$_t$ and the mode intensity μ$_{t-1}$ at the last time instance t−1 in accordance with Equation (1) as follows:

$$\mu_t = (1-\rho)\mu_{t-1} + \rho I_t \quad (1)$$

The variance σ$^2$ of the Gaussian model can also be updated using the weighted average, in accordance with the Equation (2) as follows:

$$\sigma_t^2 = (1-\rho)\sigma_{t-1}^2 + \rho(I_t-\mu_t)^T(I_t-\mu_t) \quad (2)$$

The linear weight ρ can be fixed (e.g., 0≤ρ≤1), where ρ closer to one (1) represents a fast learning rate because linear weight ρ favours the input intensity I$_t$ over the previous mode intensity μ$_{t-1}$. Similarly, a linear weight ρ closer to zero (0) represents a slow learning rate because linear weight ρ favours the previous mode intensity μ$_{t-1}$ over the input intensity I$_t$. Scene model with a fast learning rate adapts much faster to the changing scene than scene model with a slow learning rate. The linear weight ρ can also be varied based on how close the input intensity I matches the mode intensity μ. For example, linear weight ρ can be set proportional to the probability of I belonging to Gaussian model η(μ,σ) in accordance with Equation (3) as follows:

$$\rho = \alpha\eta(I_t|\mu_{t-1},\sigma_{t-1}) \quad (3)$$

where α is a learning rate (0≤α≤1). A mixture weight ω$_k$ is also recorded for each Gaussian model η$_k$(μ,σ) of the mixture of Gaussians at each visual element in accordance with Equation (4) as follows:

$$\omega_{k,t} = (1-\alpha)\omega_{k,t-1} + \alpha M_{k,t} \quad (4)$$

where the mode matching flat M$_{k,t}$ is either one (1) if I$_t$ matches Gaussian mode η$_k$(μ$_{t-1}$,σ$_{t-1}$), or zero (0) otherwise.

In one arrangement, the scene model is modelled by a mode intensity μ with a predetermined fixed variance σ$^2$ corresponding to the noise level in the corresponding image. An appearance count ω records how many times the mode intensity μ has been successfully matched since creation. An approximate median filter is used to update the mode intensity μ by a matched input intensity I in accordance with Equation (5) as follows:

$$\mu_t = \begin{cases} \mu_{t-1} + 1 & \text{if } I_t > \mu_{t-1} + \varepsilon \\ \mu_{t-1} & \text{otherwise} \\ \mu_{t-1} - 1 & \text{if } I_t < \mu_{t-1} - \varepsilon \end{cases} \quad (5)$$

where the mode intensity μ$_t$ at a current time instance t is either incremented by one (1), the same, or decremented by one (1) from the mode intensity μ$_{t-1}$ at the previous time instance t−1. A small tolerance ε (e.g., ε=3 for a 256-level dynamic range of an 8-bit integer) is used in the test in Equation (5) so that the mode intensity remains unchanged if intensity, I, differs from μ$_{t-1}$ by only a noise amount. As a result, no write access is required to update a fixed background mode at a visual element if the visual element is not visited by a foreground object. In an arrangement of approximate median update is also more memory-efficient, requiring only two numbers (μ, ω) to model a scene mode, compared to three numbers (μ, ω, ω) per scene mode for the weighted average update arrangement.

The mode creation step 470 of FIG. 4A will now be described in further detail. A multi-mode scene model maintains multiple intensity modes at each visual element. Each mode μ$_k$ is associated with an appearance count ω$_k$ (similar to the mixture weight in MoG), which specifies how many times the mode is successfully matched since creation. In a scene with moving foreground objects, the mode with a largest appearance count often belongs to the background because the foreground objects are transient (as determined at step 350 in FIG. 3). When a new mode is created, the new mode replaces an existing mode with the lowest appearance count to avoid deleting a background mode. The appearance count of the new mode is initialised with zero.

At step 350, the method 300 can determine one or more scene modes as background for the purpose of background subtraction. If there is a mode with a dominant appearance count (e.g., more than 70% of total mode counts), the mode with a dominant appearance count is classified as the sole background mode. If there are two or more modes with large appearance counts, the two or more modes together form a background model that can represent a dynamic background texture (e.g., swaying tree leaves, rippling water, . . . ) or different appearances of a static background under different lighting conditions (shadow, fully lit, . . . ). Non-background modes usually come from foreground objects because stray intensities such as the mixed intensities at foreground-background boundaries have been prevented from contributing to the scene model in FIG. 4A. If the modelled scene is expected to have a static background under one lighting condition, as few as two scene modes can be used, one as background and the other as foreground. The sole foreground mode will be constantly replaced by new foreground intensities but the background mode with dominant, large appearance count will be maintained.

The method 500 of classifying visual elements, as executed at step 360, will now be described in detail with reference to FIG. 5. The method 500 may be implemented as one or more software code modules of the software application program 133 resident in the storage module 109 and being controlled in its execution by the processor 105.

The method 500 starts at receiving step 510, where an input image and a background model are received under execution of the processor 105.

Then at differencing step 520, an absolute difference between the input image and the background model is determined, under execution of the processor 105. In case the background model contains only one background mode per visual element, the background differencing is simply an absolute difference between the input image I and the background image B. If there are multiple background modes $B_k$ per visual element, the minimum absolute difference $|I-B_k|$ amongst all k background modes are selected. If the input and background model are colour images, a sum of absolute difference over all colour channels may be used to produce a scalar background difference. As such, the minimum distance from an input image to a background mode at each visual element is determined at step 520.

In step 530, regions of large intensity difference against the background are found by thresholding the background differencing result in step 520. These regions contain substantially changed pixels from the background model, which are candidates for foreground or shadow detection. Two embodiments are now described. In a first embodiment, the changed pixels are detected by comparing the background differencing result to a single change detection threshold $T_{change}$ (e.g., $T_{change}=16$). The threshold $T_{change}$ should be larger than noise level but smaller than the minimum difference between a foreground colour and a background colour. Change detection is therefore easier if the foreground objects and background have large colour difference. In a second and preferred embodiment, a mask of changed pixels is derived from the background differencing result using hysteresis thresholding (also known as double thresholding). Hysteresis thresholding segments the background difference using a low threshold and a high threshold (e.g., $T_{hyster}=10$ 30). The high-threshold mask contains pixels with large background differences, which are more likely to be foreground or strong shadow. The low-threshold mask contains pixels with smaller background differences, which cover foreground-background boundary pixels and soft shadow but also false positive detection. The low-threshold mask contains all pixels in the high-threshold mask but not vice versa. Using the high-threshold pixels as seeds, the change mask is grown to all connected pixels in the low-threshold mask. This hysteresis threshold mask comprises of connected regions, each with at least one pixel of high background difference. The hysteresis threshold mask is less noisy than the low-threshold mask and contains more correctly detected foreground/shadow pixels than the high-threshold mask.

In classifying step 540, the changed pixels detected in step 530 are further classified into either foreground or shadow pixels using input colours and corresponding background colours of the changed pixels. Two arrangements of step 540 are now described. Both arrangements of step 540 are based on the assumption that pixels in shadow have similar colour tone but darker luminance than the background model. Such an assumption applies if the light source is achromatic (i.e. white light) or close to white.

In a first shadow classification arrangement of step 540, shadow classification in the Hue-Saturation-Value (HSV) colour space is performed. The HSV colours may be converted from RGB colours using any suitable method, where hue is the normalised hue angle ($0 \leq H \leq 1$), saturation is the colour saturation ($0 \leq S \leq 1$), and value is the normalised luminance ($0 \leq V \leq 1$). In accordance with Equation (6), below, an input colour $HSV_i$ is classified as shadow given the fully lit background colour $HSV_b$ if $$|H_i-H_b| \leq T_H, |S_i-S_b| \leq T_S, T_{Vlo} \leq V_i/V_b \leq T_{Vhi} \quad (6)$$

where $T_H$ and $T_S$ are thresholds on hue and saturation difference, $T_{Vlo}$ and $T_{Vhi}$ are low and high thresholds on luminance ratio. The hue and saturation thresholds are typically small (e.g., $T_H=0.03$, $T_S=0.15$) to select input pixels with similar colour tone to the background. The luminance ratio thresholds are typically less than one (e.g., $T_{Vlo}=0.4$ and $T_{Vhi}=0.95$) to select shadow pixels slightly darker than the background.

The second shadow classification arrangement, as performed at step 540, operates in the RGB colour space, which may be preferable over the HSV colour space because colour conversion is not required. Instead of constraining the hue and saturation, a threshold is put on the angle between the input colour $RGB_i$ and the background colour $RGB_b$ in accordance with Equation (7), as follows:

$$\text{angle}(RGB_i, RGB_b) \leq T_{angle}, T_{Vlo} \leq V_i/V_b \leq T_{Vhi}. \quad (7)$$

The angle threshold is typically small (e.g., $T_{angle}=0.1$ radian) to ensure similar colour tone between the input colour $RGB_i$ and the background colour $RGB_b$. Changed pixels that are not shadow are classified as foreground. The shadow- and foreground-classified pixels form raw shadow and foreground masks, which are post-processed in post-processing step 550 before final masks are output in outputting step 560.

Mathematical morphology may be used at step 550 to clean up small holes and islands in the raw foreground and shadow masks determined at step 540. Small binary holes, which are groups of connected pixels with values zero (0), can be eliminated using morphological closing. Small binary islands, which are groups of connected pixels with values one (1), can be eliminated using morphological opening. Step 550 further improves the quality of the foreground and shadow masks, reducing false positive (islands) and false negative (holes) detection.

Then at outputting step 560, the post-processed foreground and shadow masks are output. Shadow pixels can be treated differently from background or foreground pixels when updating scene model. A shadow pixel is technically still a background pixel, but intensity of a shadow pixel should not be used to update the matching background intensity mode. However, a shadow pixel can update the appearance count of the matching background mode. A shadow pixel is different from a foreground pixel. While the input foreground pixel is used to either update a matching foreground mode or create a new mode, the input shadow intensity should not be used to update any existing mode nor create a new mode.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

The invention claimed is:

1. A method for an apparatus to modify a scene model for a sequence of input images, the method comprising:
   receiving a plurality of scene modes associated with the sequence of input images;
   selecting, for each of a plurality of image pixels in an input image of the sequence of input images, two scene modes from the received plurality of scene modes, wherein selecting the two scene modes is based on distances between colour value of the image pixel and colour values of the scene modes at a corresponding pixel location;
   determining whether the image pixel colour value matches the colour value of any of the selected scene modes based on distance between the image pixel colour value and the colour value of any of the selected scene modes being less than a predetermined threshold; and
   determining whether the image pixel colour value is a mixture of the colour values of the selected scene modes based on distances and colour angles between the image pixel colour value and the colour values of the selected scene modes; and
   processing the colour value,
   wherein, in case where there is one matched mode and the image pixel colour value is not a mixture of the colour values of the selected scene modes, processing the colour value includes modifying the colour value of a closest selected scene mode using the image pixel colour value, and
   wherein, in a case where the image pixel colour value matches the colour values of both selected modes or in a case where the image pixel colour value is a mixture of the colour values of the selected scene modes, processing the colour value includes maintaining the colour values of the plurality of scene modes.

2. The method according to claim 1, wherein, in a case where the image pixel colour value matches none of the colour values of selected scene modes and the image pixel colour value is not a mixture of the colour values of the selected scene modes, processing the colour value includes creating a new scene mode at the colour value of the image pixel.

3. The method according to claim 2,
   wherein each scene mode is associated with an appearance count, and
   wherein, when the mode is created, the appearance count of each mode is initialised with zero, and
   wherein, when the mode is matched by the image pixel colour value, the appearance count is incremented.

4. The method according to claim 2, wherein creating the new scene mode at the colour value of the image pixel includes replacing an existing scene mode with a lowest appearance count.

5. The method according to claim 2, further comprising selecting one or more scene modes with high appearance counts to form a background model for the sequence of input images.

6. The method according to claim 5, further comprising segmenting the input image into foreground, background or moving shadow pixels based on each image pixel colour value compared to the colour values of the formed background model at the corresponding pixel location.

7. The method according to claim 1, further comprising using foreground/background segmentations of images from multiple cameras to synthesise images as seen by a virtual camera viewpoint.

8. The method according to claim 7, further comprising generating a free viewpoint video by combining the synthesised images from a sequence of virtual camera viewpoints,
   wherein the sequence of virtual camera viewpoints following a predetermined camera path or a camera path set by a human operator.

9. The method according to claim 1,
   wherein the colour angle is an angle formed between the image pixel colour value and the colour values of the selected scene modes in an illustration having the image pixel colour value, the colour values of the selected scene modes, and a colour spectrum, and
   wherein, in a case where the colour angle is smaller than an angle threshold, the image pixel colour value is a mixture of the colour values of the selected scene modes.

10. The method according to claim 1, further comprising performing shadow classification in the Hue Saturation Value (HSV) colour space, where hue is the normalised hue angle ($0 \leq H \leq 1$), saturation is the colour saturation ($0 \leq S \leq 1$), and value is the normalised luminance ($0 \leq V \leq 1$).

11. An apparatus to modify a scene model of a sequence of input images, the apparatus comprising:
    one or more processors; and
    memory storing instructions that, when executed by the one or more processors, cause the apparatus to perform operations including:
    receiving a plurality of scene modes associated with the sequence; of input images,
    selecting, for each of a plurality of image pixels in an input image of the sequence of input images, two scene modes from the received plurality of scene modes, wherein selecting the two scene modes is based on distances between colour value of the image pixel and colour values of the scene modes at a corresponding pixel location,
    determining whether the image pixel colour value matches the colour value of any of the selected scene modes based on distance between the image pixel colour value and the colour value of any of the selected scene modes being less than a predetermined threshold, and
    determining whether the image pixel colour value is a mixture of the colour values of the selected scene modes based on distances and colour angles between the image pixel colour value and the colour values of the selected scene modes, and
    processing the colour value,
    wherein, in case where there is one matched mode and the image pixel colour value is not a mixture of the colour values of the selected scene modes, processing the colour value includes modifying the colour value of a closest selected scene mode using the image pixel colour value, and
    wherein, in a case where the image pixel colour value matches the colour values of both selected modes or in a case where the image pixel colour value is a mixture of the colour values of the selected scene modes, processing the colour value includes maintaining the colour values of the plurality of scene modes.

12. A system having an apparatus to modify a scene model of a sequence of input images, the system comprising:
   one or more processors; and
   memory storing instructions that, when executed by the one or more processors, cause the apparatus to perform operations including:
   receiving a plurality of scene modes associated with the sequence of input images,
   selecting, for each of a plurality of image pixels in an input image of the sequence of input images, two scene modes from the received plurality of scene modes, wherein selecting the two scene modes is based on distances between colour value of the image pixel and colour values of the scene modes at a corresponding pixel location,
   determining whether the image pixel colour value matches the colour value of any of the selected scene modes based on distance between the image pixel colour value and the colour value of any of the selected scene modes being less than a predetermined threshold, and
   determining whether the image pixel colour value is a mixture of the colour values of the selected scene modes based on distances and colour angles between the image pixel colour value and the colour values of the selected scene modes, and
   processing the colour value,
   wherein, in case where there is one matched mode and the image pixel colour value is not a mixture of the colour values of the selected scene modes, processing the colour value includes modifying the colour value of a closest selected scene mode using the image pixel colour value, and
   wherein, in a case where the image pixel colour value matches the colour values of both selected modes or in a case where the image pixel colour value is a mixture of the colour values of the selected scene modes, processing the colour value includes maintaining the colour values of the plurality of scene modes.

13. A non-transitory computer-readable storage medium storing a program to cause an apparatus to perform a method to modify a scene model for a sequence of input images, the method comprising:
   receiving a plurality of scene modes associated with the sequence of input images;
   selecting, for each of a plurality of image pixels in an input image of the sequence of input images, two scene modes from the received plurality of scene modes, wherein selecting the two scene modes is based on distances between colour value of the image pixel and colour values of the scene modes at a corresponding pixel location;
   determining whether the image pixel colour value matches the colour value of any of the selected scene modes based on distance between the image pixel colour value and the colour value of any of the selected scene modes being less than a predetermined threshold; and
   determining whether the image pixel colour value is a mixture of the colour values of the selected scene modes based on distances and colour angles between the image pixel colour value and the colour values of the selected scene modes; and
   processing the colour value,
   wherein, in case where there is one matched mode and the image pixel colour value is not a mixture of the colour values of the selected scene modes, processing the colour value includes modifying the colour value of a closest selected scene mode using the image pixel colour value, and
   wherein, in a case where the image pixel colour value matches the colour values of both selected modes or in a case where the image pixel colour value is a mixture of the colour values of the selected scene modes, processing the colour value includes maintaining the colour values of the plurality of scene modes.

* * * * *